(12) United States Patent
Gong et al.

(10) Patent No.: US 9,233,468 B2
(45) Date of Patent: Jan. 12, 2016

(54) COMMANDING A MOBILE ROBOT USING GLYPHS

(71) Applicant: iRobot Corporation, Bedford, MA (US)

(72) Inventors: Sherman Gong, Sudbury, MA (US); Rogelio Neumann, Somerville, MA (US)

(73) Assignee: iRobot Corporation, Bedford, MA (US)

( * ) Notice: Subject to any disclaimer, the term of this patent is extended or adjusted under 35 U.S.C. 154(b) by 116 days.

(21) Appl. No.: 14/077,380

(22) Filed: Nov. 12, 2013

(65) Prior Publication Data

US 2015/0134115 A1    May 14, 2015

(51) Int. Cl.
*B25J 9/16* (2006.01)

(52) U.S. Cl.
CPC .............. *B25J 9/1697* (2013.01); *Y10S 901/47* (2013.01)

(58) Field of Classification Search
CPC .............. B25J 9/00; B25J 9/0003; B25J 9/16; B25J 9/1694; B25J 9/1697; B25J 9/1656; B25J 9/1661; G05D 1/0246; G05D 1/0248; G05D 1/0251; G05D 1/0253
USPC .................................. 700/257, 258, 259, 264
See application file for complete search history.

(56) References Cited

U.S. PATENT DOCUMENTS

| | | |
|---|---|---|
| 6,389,329 B1 | 5/2002 | Colens |
| 6,532,404 B2 | 3/2003 | Colens |
| 6,594,844 B2 | 7/2003 | Jones |
| 6,690,134 B1 | 2/2004 | Jones et al. |
| 6,781,338 B2 | 8/2004 | Jones et al. |
| 6,809,490 B2 | 10/2004 | Jones et al. |
| 6,965,209 B2 | 11/2005 | Jones et al. |
| 7,155,308 B2 | 12/2006 | Jones |
| 7,173,391 B2 | 2/2007 | Jones et al. |
| 7,196,487 B2 | 3/2007 | Jones et al. |
| 7,388,343 B2 | 6/2008 | Jones et al. |
| 7,389,156 B2 | 6/2008 | Ziegler et al. |
| 7,448,113 B2 | 11/2008 | Jones et al. |
| 7,571,511 B2 | 8/2009 | Jones et al. |
| 7,636,982 B2 | 12/2009 | Jones et al. |
| 7,761,954 B2 | 7/2010 | Ziegler et al. |
| 2002/0016649 A1 | 2/2002 | Jones |
| 2002/0120364 A1 | 8/2002 | Colens |
| 2003/0025472 A1 | 2/2003 | Jones et al. |
| 2004/0020000 A1 | 2/2004 | Jones |
| 2004/0049877 A1 | 3/2004 | Jones et al. |
| 2004/0187457 A1 | 9/2004 | Colens |
| 2004/0207355 A1 | 10/2004 | Jones et al. |
| 2005/0067994 A1 | 3/2005 | Jones et al. |
| 2005/0151670 A1* | 7/2005 | Johnson ................... G08G 1/07 340/907 |
| 2005/0204717 A1 | 9/2005 | Colens |
| 2005/0222722 A1* | 10/2005 | Chen ......................... B62D 1/02 701/23 |
| 2006/0064212 A1* | 3/2006 | Thorne ................ G05D 1/0246 701/23 |
| 2006/0184013 A1* | 8/2006 | Emanuel ................... G01S 5/16 600/426 |
| 2007/0266508 A1 | 11/2007 | Jones et al. |
| 2008/0140255 A1 | 6/2008 | Ziegler et al. |

(Continued)

*Primary Examiner* — Stephen Holwerda
(74) *Attorney, Agent, or Firm* — Honigman Miller Schwartz and Cohn LLP

(57) ABSTRACT

A method of operating a robot includes receiving image data from an image capture device of the robot. The image data is representative of a glyph viewed by the image capture device on the display of a computing device within a field of view of the image capture device. The method further includes determining, at a controller, a command message based on the glyph represented in the image data and issuing a command to at least one resource or component of the robot based on the command message.

15 Claims, 9 Drawing Sheets

(56) References Cited

U.S. PATENT DOCUMENTS

| | | |
|---|---|---|
| 2008/0155768 A1 | 7/2008 | Ziegler et al. |
| 2008/0307590 A1 | 12/2008 | Jones et al. |
| 2010/0049365 A1 | 2/2010 | Jones et al. |
| 2010/0257690 A1 | 10/2010 | Jones et al. |
| 2010/0257691 A1 | 10/2010 | Jones et al. |
| 2010/0263158 A1 | 10/2010 | Jones et al. |

* cited by examiner

COMMANDING A MOBILE ROBOT USING GLYPHS

TECHNICAL FIELD

This disclosure relates to methods and apparatuses for commanding a robot using glyphs.

BACKGROUND

Mobile robots are used in many different fields. For example, mobile robots are used in home settings, office settings, manufacturing settings, and military settings. Many of these robots have limited user interfaces due to limited surface area along the respective housings of the robots. In many instances, the only user interfaces are an on/off switch and/or a small LED screen. Thus, it is very difficult to provide complex commands to the mobile robot. As such, users may find configurations and control of these robots to be difficult.

SUMMARY

One aspect of the disclosure provides a method of operating a robot. The method includes receiving image data from an image capture device of the robot. The image data is representative of a glyph viewed by the image capture device on the display of a computing device within a field of view of the image capture device. The method further includes determining, at a controller, a command message based on the glyph represented in the image data and issuing a command to at least one resource or component of the robot based on the command message.

Implementations of the disclosure may include one or more of the following features. In some implementations, the glyph comprises a quick response code. Determining the control message may include determining scheduling data based on the image data; and issuing the command includes setting a robot schedule based on the scheduling data. Moreover, determining the control message may include determining network configuration data indicating a network identifier and/or a network password based on the image data. Issuing the command may include configuring a network connection of the robot based on the configuration data. In some examples, determining the control message includes determining customization data including a text string from the image data. The step of issuing the command may include configuring a customization setting based on the text string. Additionally or alternatively, the method may include monitoring the image data to identify the glyph, where determining the control message is performed after a glyph is identified in the image data.

Another aspect of the disclosure provides a method of communicating with a robot. The method includes inputting data on a computing device that includes an electronic display and a processing device in communication with the electronic display. The processing device receives the inputted data, generates a glyph representative of the inputted data, and electronically displays the glyph on the display. The method also includes positioning the computing device to orient the electronic display thereof within a field of view of an image capture device of the robot. A controller of the robot is configured to issue one or more commands based on image data received from the image capture device. The image data is representative of the glyph viewed on the display of the computing device by the image capture device. The glyph may be a quick response code.

In some implementations, the inputted data is scheduling data that is used by the robot to update a robot schedule. The inputted data may be network configuration data including a network identifier and/or a network password. The robot may use the network configuration data to configure a network connection of the robot.

In some implementations, the inputted data includes a command type and one or more command parameters. In these implementations, the step of generating the glyph may include generating a command message based on the command type and the one or more command parameters and generating the glyph based on the command message. The glyph has the command message encoded therein.

In yet another aspect of the disclosure, an autonomous robot includes a robot body, a drive system supporting the robot body and configured to maneuver the robot over a floor surface, an image capture device disposed on the robot body, and a controller in communication with the drive system and the image capture device. The controller issues a command to a component and/or resource of the robot based on image data received from the image capture device. The image data representative of a glyph is viewed on the display of a computing device by the image capture device.

In some implementations, the glyph comprises a quick response code. The controller may be configured to identify the glyph in the image data, determine a command message based on the glyph, and command the component and/or resource based on the command message. The command message may include a schedule update command and schedule parameters. The controller may update a schedule of the robot based on the schedule parameters. Additionally or alternatively, the command message includes network configuration data. The controller may configure a network connection of the mobile robot based on the network configuration data.

Another aspect of the disclosure provides a system that includes a computing device having an electronic display and a processing device in communication with the electronic display. The computing processor receives data representative of a command message, generates a glyph representative of the data, and electronically displaying the glyph on the display. The system also includes a robot having a robot body and a drive system supporting the robot body and configured to maneuver the robot over a floor surface. The robot also includes an image capture device disposed on the robot body and a controller in communication with the drive system and the image capture device. The controller issues one or more commands based on image data received from the image capture device. The image data is representative of the glyph viewed on the display of the portable electronic device by the image capture device. The glyph may be a quick response code.

In some implementations, the controller is configured to decode the glyph represented in the image data to obtain the control message and to issue the one or more commands based on the control message. The control message may include network configuration data, and the controller may configure a network connection of the robot based on the network configuration data.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
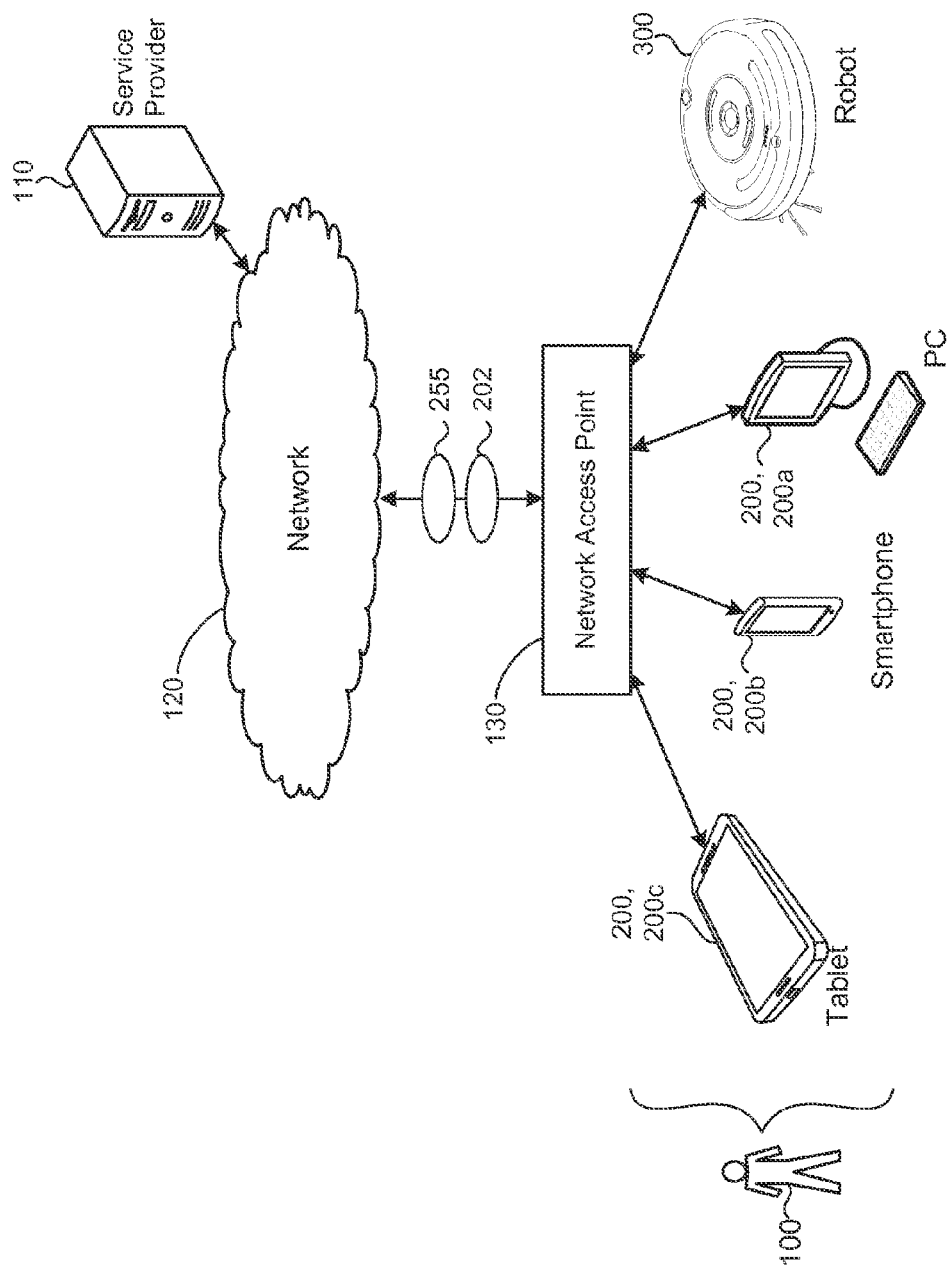
FIG. 1A is a schematic view illustrating an exemplary environment of a mobile robot.
Figure 1B:
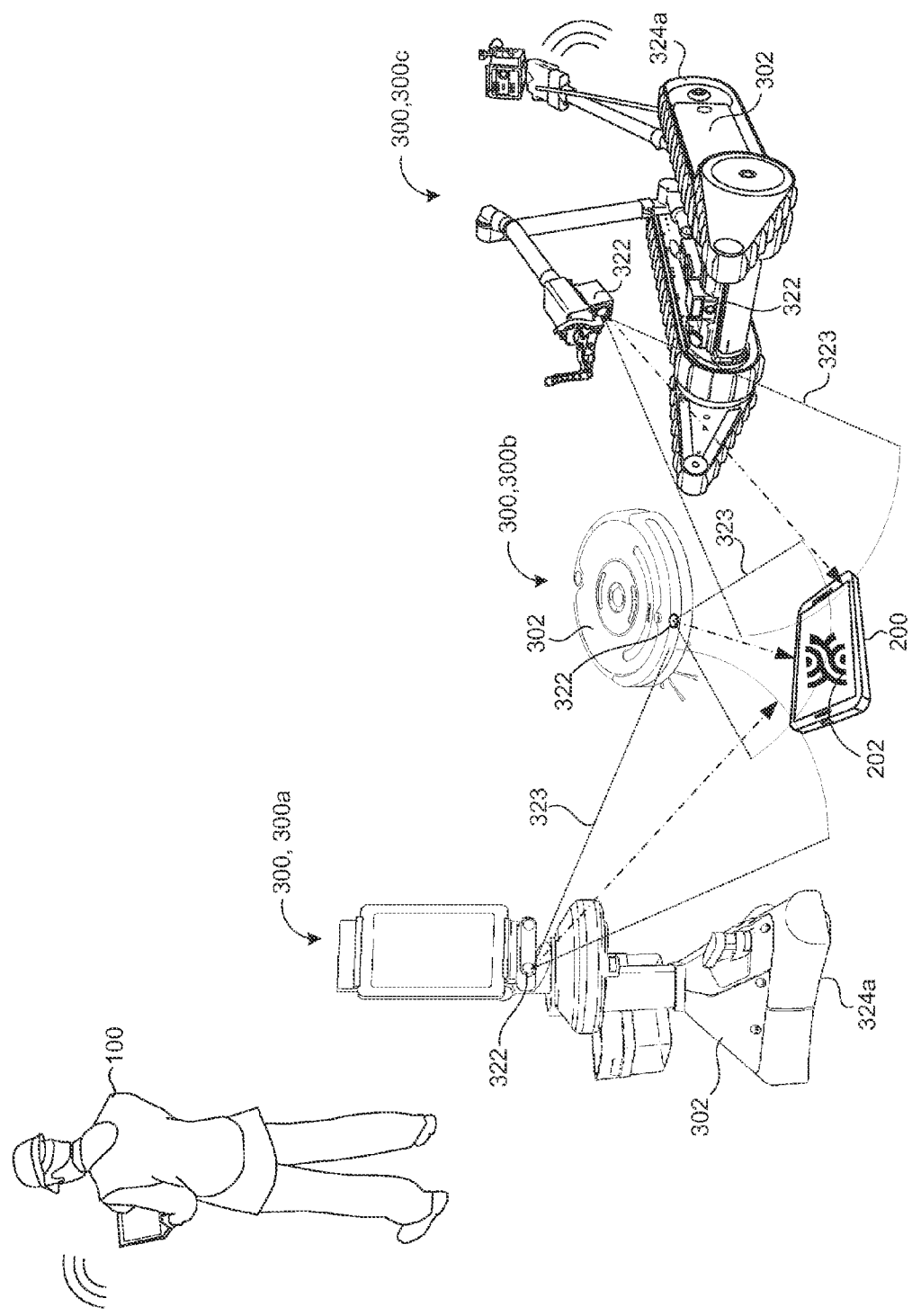
FIG. 1B is a schematic view illustrating exemplary mobile robots receiving commands by way of a glyph displayed by a computing device.
Figure 3:
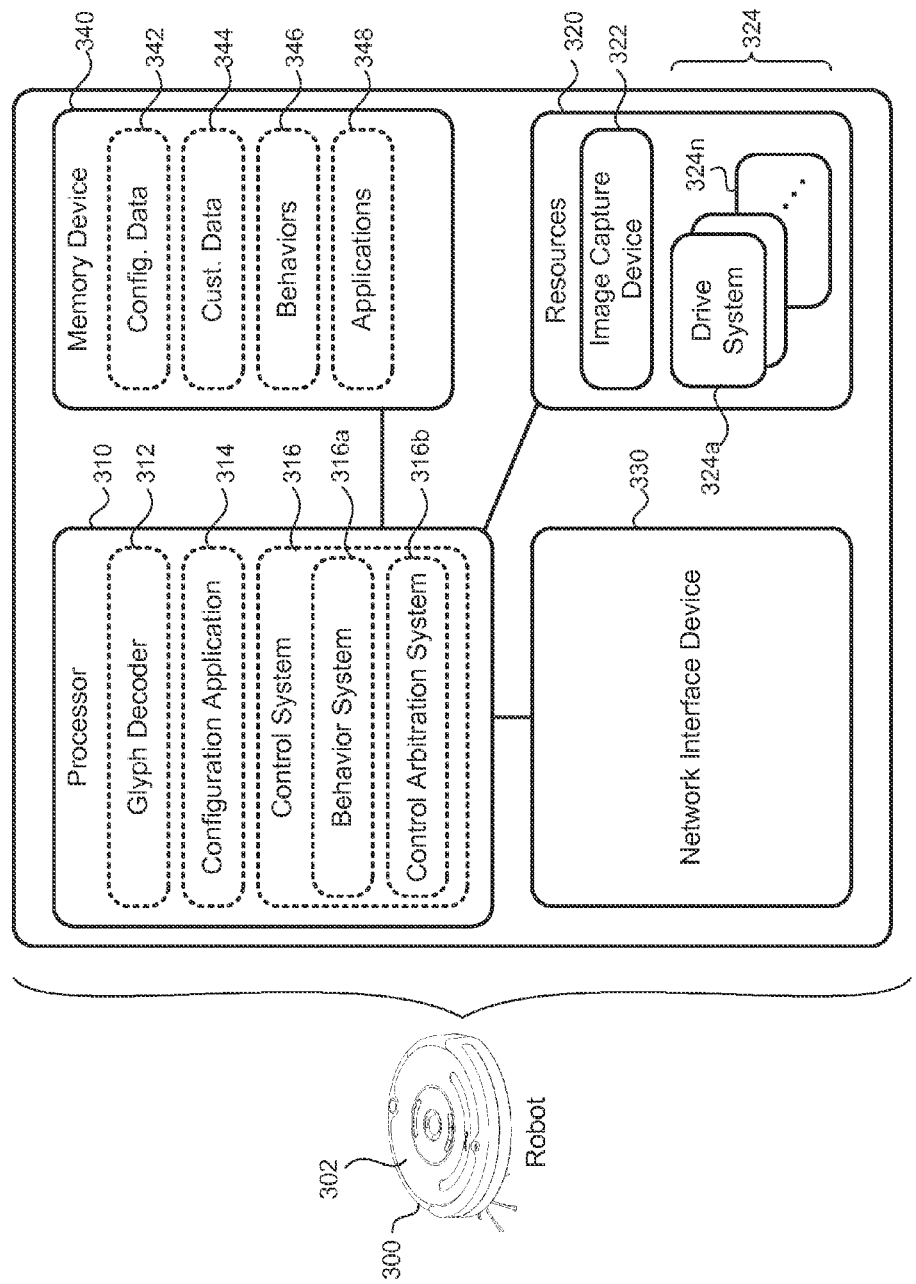
FIG. 3 is a schematic view illustrating exemplary components of an autonomous mobile robot.

Referring to FIGS. 1A and 1B, a user 100 may need to interact with an autonomous mobile robot 300 ("mobile robot" or "robot") having limited processing power and limited or no user interface on its robot body 302 (FIG. 3). To overcome the processing limitations of the mobile robot 300, the robot 300 may be configured to access a service provider 110 over a network 120. The service provider 110 can provide cloud services to the mobile robots 300. For example, the service provider 110 can receive image data captured by a camera of a mobile robot 300 and process the image data to identify potential obstacles. Additionally or alternatively, the service provider 110 can provide updates to the mobile robot 300. It is envisioned that a service provider can provide any number of cloud-based services to the mobile robot 300. Non-limiting examples of mobile robots 300 include video conferencing robots 300a, surface cleaning robots 300b, and military tactical robots 300c.

In order to access the service provider 110, a mobile robot 300 may require a connection to a network 120. To connect to the network 120, the mobile robot 300 can connect to a network access point 130 (e.g., a wireless router). One issue that arises, however, is that many mobile robots 300 have limited user interfaces, such that communication between a user 100 and a robot 300 is severely limited. For example, a robot 300 may include an on/off switch and a camera, but may not include a QWERTY keyboard, touchscreen, or a display device. Thus, the user 100 may be prevented from providing the mobile robot 300 with the network configuration data (e.g., SSID and password) to enable the robot 300 to connect to the network access point 130.

In some implementations, the user 100 can provide commands to the mobile robot 300 using a computing device 200. Non-limiting examples of computing devices 200 include a tablet computer 200a, a smartphone 200b, and a personal computer (PC) 200c. In particular, the user inputs a command to the computing device 200 via a user interface (e.g., touchscreen or keyboard). In some implementations, the computing device 200 generates a glyph 202 containing the command and displays the glyph 202 on a display device (e.g., touchscreen or monitor) of the computing device 200. In some implementations, the computing device 200 transmits the command to a service provider 110, which in turn generates the glyph 202 and transmits the glyph to the computing device 200. The mobile robot 300 captures image data (e.g. a digital photograph) that includes the glyph 202, decodes the glyph 202 to determine the command, and issues a command to one of its resources or components. As used herein, the term glyph 202 can refer to any image that is capable of storing data, including but not limited to barcodes and matrix barcodes. A matrix barcode is a two-dimensional bar code. Matrix bar codes can include quick-response codes ("QR-codes"). The foregoing framework departs from traditional use of QR-codes, which are usually displayed on advertisements or other static mediums and meant to be captured by mobile computing devices (e.g., smartphones 200b and tablets 200a).

To connect the mobile robot 300 to a network access point 130, a user 100 can enter network configuration data into a computing device 200. The computing device 200 can generate the glyph 202 based on the network configuration data. The computing device 200 displays the glyph 202 and the mobile robot 300 captures an image of the displayed glyph 202. The mobile robot 300 decodes the glyph 202 to obtain the network configuration data and connects to the network access point 130 using the network configuration data. The foregoing is but one example of the types of commands that a user can issue to a robot 300 using a computing device 200.

The user 100 can provide any suitable type of commands to the mobile robot 300 using the computing device 200. Non-limiting examples of commands include a reset time command to set the time on a clock of a robot 300, an update schedule command to schedule tasks of the robot 300, an update network configuration command to configure a network connection using provided configuration data, an update username command to store user names (which the robot 300 can speak), a delay task command to delay the start of a task, a vacation setting command to operate the robot 300 in a "vacation setting" (e.g., run on a limited number of days during the week), a debug mode command to operate the robot 300 in a debug mode, a report command to have the robot 300 send all collected data to a service provider 110, an update behaviors command to update parameters associated with behaviors, and update mode commands to set certain modes (e.g., ignore cliffs). The foregoing list of commands is provided for example only.

In some implementations, a glyph 202 (e.g., a QR-code) can store up to 3 KB of data. In these implementations, the command can include up to 3 KB of data. Furthermore, in some implementations, if a command is larger than 3 KB, the glyph 202 can contain a command to open a uniform resource locator (either static or dynamic), which directs the robot 300 to the larger commands or files (e.g., update files).

Figure 2A:
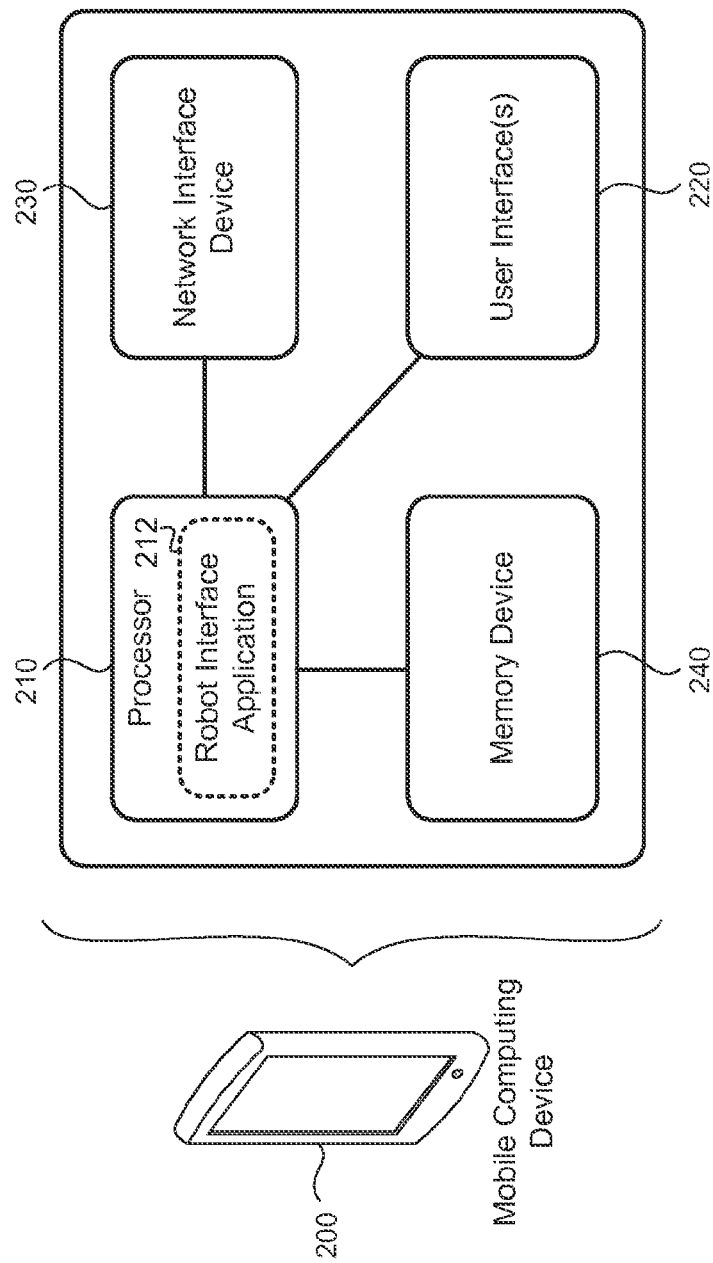
FIG. 2A is a schematic view illustrating exemplary components of a computing device.
Figure 2B:
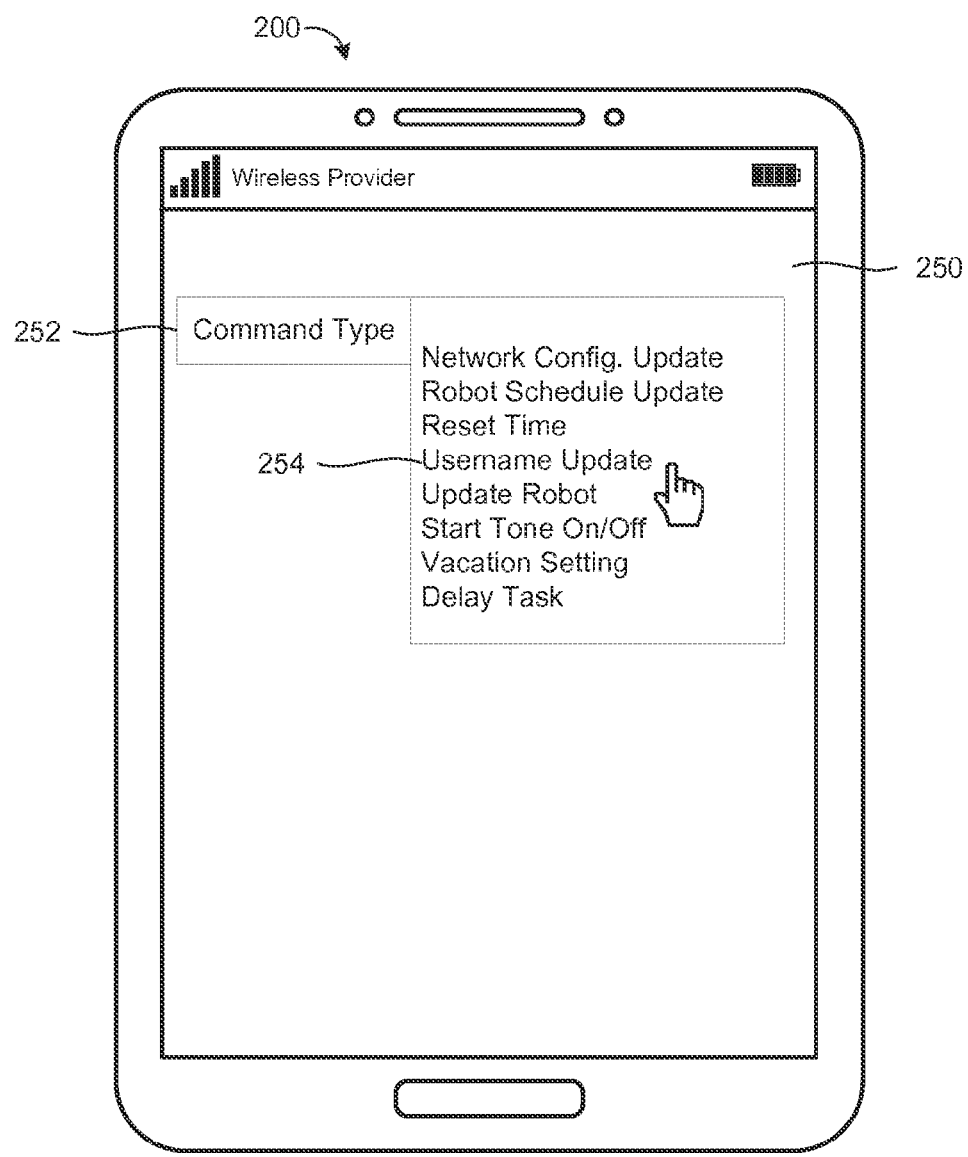
FIGS. 2B and 2C are schematic views illustrating an exemplary computing device receiving a command and displaying a glyph corresponding thereto.
Figure 2C:
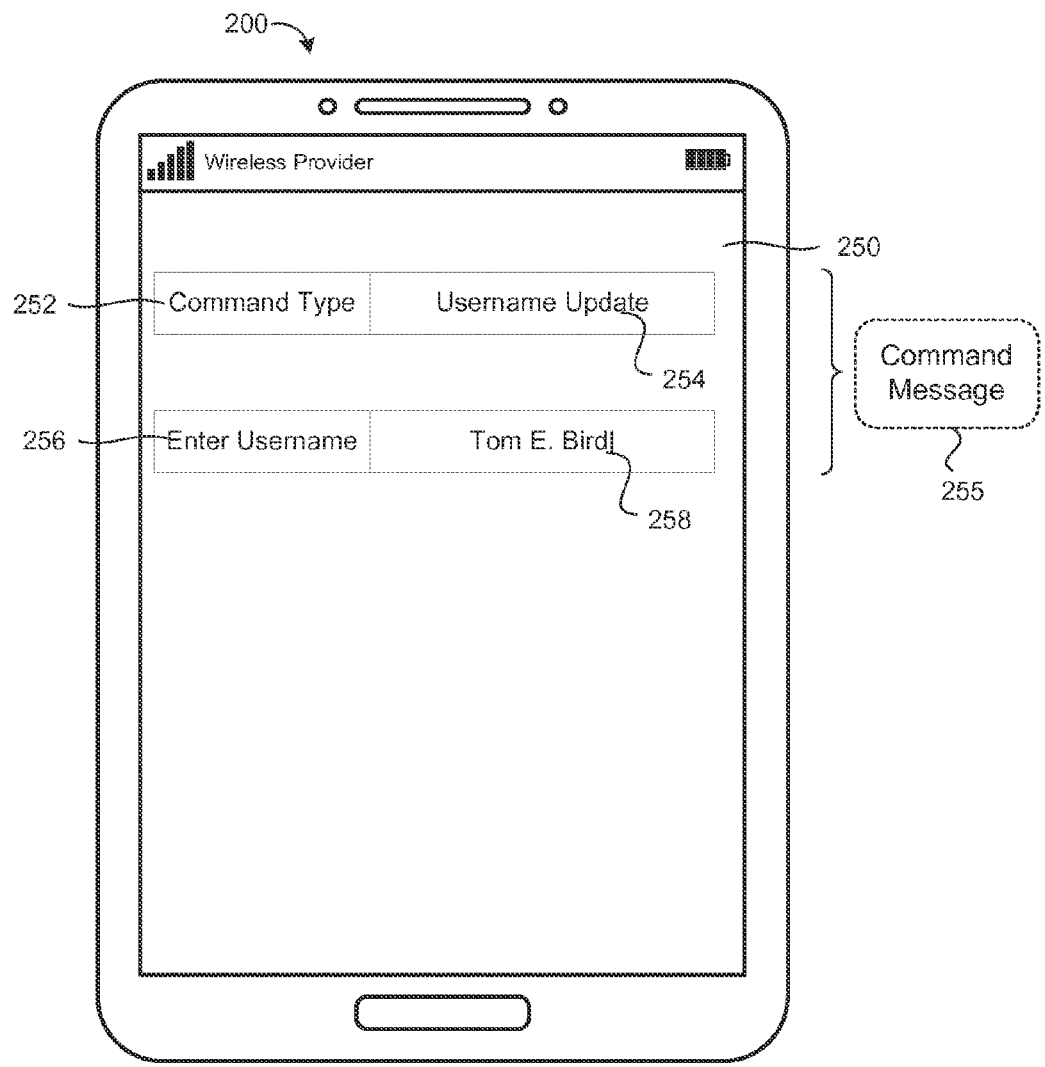
Figure 2D:
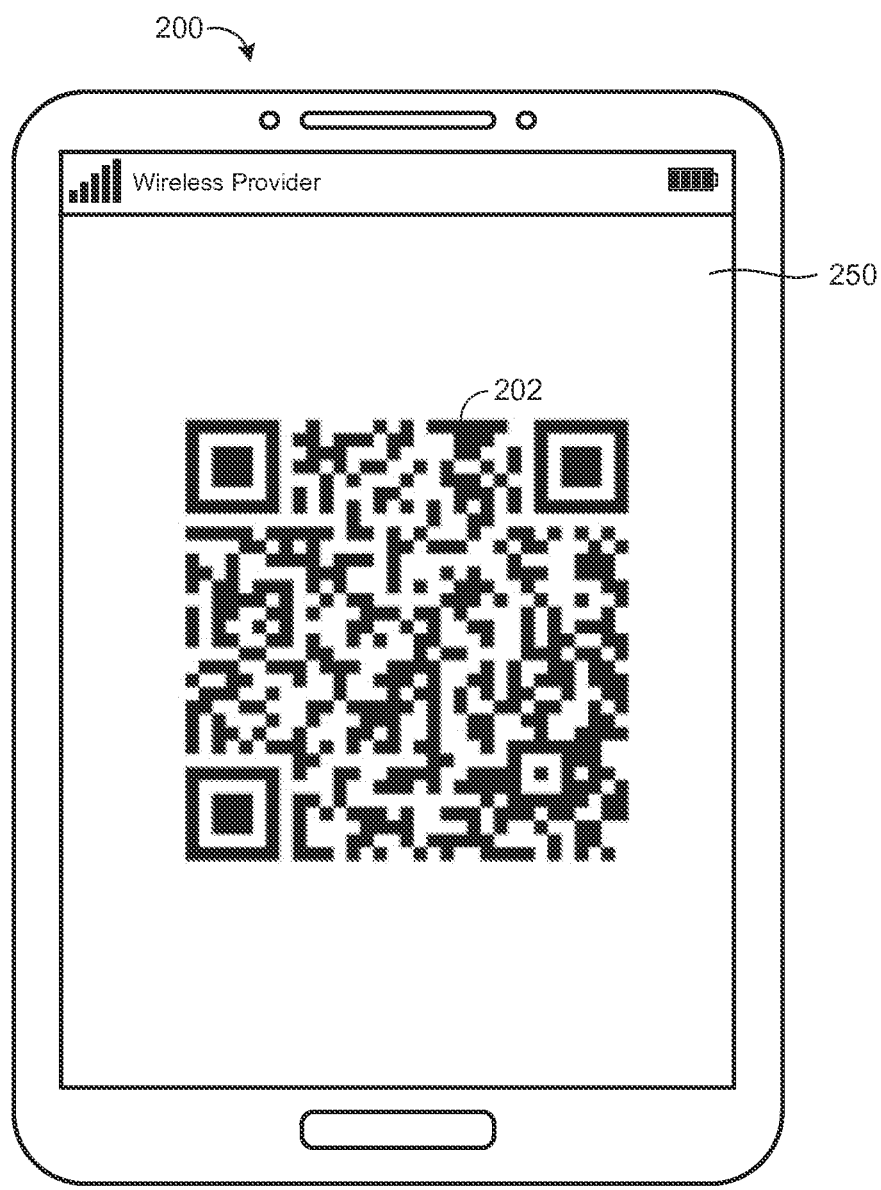
FIG. 2D is a schematic view illustrating an exemplary computing device displaying a glyph.

Referring now to FIGS. 2A-2D, FIG. 2A illustrates example components of a computing device 200 configured to display glyphs 202. In the illustrated example, the computing device 200 includes a processing device 210, one or more user interfaces 220, a network interface device 230, and memory 240. The computing device 200 can include additional components not depicted in FIG. 2A. FIGS. 2B-2D illustrate an example graphical user interface (GUI) 250 being displayed by a robot interface application 212 being executed by an example computing device 200. The GUI 250 receives a command from a user and displays a glyph 202 corresponding to the command.

The processing device 210 includes one or more processors that execute machine-readable instructions. In implementations where the processing device 210 includes more than one processor, the processors can operate in an individual or distributed manner. The processing device 210 can execute a robot interface application 212, which can be implemented as machine-readable instructions.

The one or more user interfaces 220 receive input from and/or provide output to a user. Examples of user interfaces include, but are not limited to, a touchscreen, a touch pad, a display device, a speaker, a microphone, a qwerty keyboard, and a mouse. The user interface(s) 220 receive input from the user and display the glyph 202.

The network interface device 230 includes one or more suitable devices configured to send and receive data via the network 120. The network interface device 230 can perform wireless or wired communication using any known or later developed communication standards.

The memory device 240 can include one or more non-transitory computer readable mediums. Examples of the memory device can include read only memory and random access memory. The memory device 240 can store the computer readable instructions which define the robot interface application 212.

The robot interface application 212 can be stored in the memory 240 of the computing device 200 and executed by the processing device 210. In some implementations, the robot interface application 212 can be downloaded from an application retail site and installed on the computing device 200. The robot interface application 212 can perform a number of functions, allowing the user to interact with the robot 100.

The robot interface application 212 provides a GUI 250 that allows a user to enter commands for the mobile robot 300. As shown in FIG. 2B, the GUI 250 may provide a field 252 or menu 252 that displays all of the possible commands for the mobile robot 300. The user 100 can select a command type 254 from the possible command types. In the illustrated example, the user has selected the command type "username update." In response to the user selection of a command, the robot interface application 212 can display a set of command parameter fields 256 corresponding to the command, as shown in FIG. 2C. The user can enter command parameters 258 into each respective command parameter field 256. In the illustrated example, the user has entered the user name "Tom E. Bird" in the command parameter field 256. In another example, if the user 100 selects a "configure network" command, the robot interface application 212 may provide a first field 256 for the user to enter a network identifier (e.g., SSID) and a second field 256 for the user to enter a password. In another example, if the user 100 selects a command type of schedule update, the robot interface application 212 can display a first parameter field 256 to select the days on which the robot 300 is to operate and a second parameter field 256 to select a time of the day at which the robot 300 is to operate.

In response to receiving a command, the robot interface application 212 generates a command message 255. A command message 255 can identify the type of command and one or more command parameters. The following is an example of a command message 255:

Command Message
Command Type: [Command_Type]
Command Parameter 01: [Command_Parameter]
Command Parameter 02: [Command_Parameter]
. . .
Command Parameter N: [Command_Parameter]

The robot interface application 212 determines a glyph 202 based on the command message 255. The command message 255 is encoded into the glyph 202. In some implementations, the robot interface application 212 determines the glyph 202 by generating a glyph 202 (e.g., a QR-code) that contains the command message 255 encoded therein. In other implementations, the robot interface application 212 determines the glyph 202 by transmitting the command message 255 to a service provider 110 that encodes the command message 255 into a glyph 202 and transmits the glyph 202 back to the computing device 200. Once the glyph 202 is generated, the computing device 200 can display the glyph 202 via a graphical user interface 250, as shown in FIG. 2D. The user 100 can position the computing device 200 proximate to the mobile robot 300, such that glyph 202 is in the field of view 323 of an image capture device 322 (e.g., camera) of the robot 300. For example, if the computing device 200 is a smartphone or tablet, the user 100 can hold the computing device 200 such that the touchscreen 220 of the computing device 100 faces an image capture device 322 of the mobile robot 300.

FIG. 3 illustrates example components of a mobile robot 300. The mobile robot 300 can include a controller 310, a set of resources 320, a network interface device 330, and memory 340. The mobile robot 300 can include additional components not shown in FIG. 3.

The controller 310 includes one or more processors that execute machine-readable instructions. In implementations where the control device 310 includes more than one processor, the processors can operate in an individual or distributed manner. The controller 310 can execute a glyph decoder 312, a configuration application 314, and a control system 316. The control system 316 may include a behavior system 316a and a control arbitration system 316b.

The set of resources 320 includes an image capture device 322 and other suitable resources 324. In some implementations, the image capture device 322 is a camera. While one image capture device 322 is illustrated, the mobile robot 300 may include additional cameras. The image capture device 322 may be disposed on an exterior of the body of the robot 300. The image capture device 322 may have a resolution of 320×240 or higher. In some examples, the image capture device 322 is a 3D volumetric imaging device or stereo camera capable of obtaining point clouds of its surrounding environment.

Examples of other suitable resources include, but are not limited to, a drive system, cleaning systems, one or more sensors, a manipulator arm, motors, actuators, or other electronic components. Each resource 322, 324 may be controlled by the controller 310 or may include a sub-controller that may receive input from the controller 310. For example, the controller 310 can command the drive system such that the drive system maneuvers the robot 300 across a floor surface.

The network interface device 330 includes one or more suitable devices configured to send and receive data via the network 120. The network interface device 330 can perform wireless or wired communication using any known or later developed communication standards. In some implementations, the network interface device 330 includes a wireless transceiver configured to communicate using the IEEE 802.11 standard.

The memory device 340 can include one or more non-transitory computer readable mediums. Examples of the memory device 340 can include read-only memory and random access memory. The memory device 340 can store any suitable data. For example, the memory device 340 can store configuration data 342, customization data 344, behaviors 346, and applications 348. Configuration data 342 can include, but is not limited to, a date, a current time, a network identifier (e.g., SSID), and a network password. Customization data 344 can include, but is not limited to, a user name, a schedule, a vacation flag indicating whether the robot 300 is operating in a vacation mode, and a sound flag indicating whether the robot 300 is to audibly notify the user 100 of events. Behaviors 346 and applications 348 are discussed in further detail below.

The glyph decoder 312 decodes glyphs 202 and initiates execution of any commands 258 encoded in the glyphs 202. In some implementations, the glyph decoder 312 may have a corresponding behavior 346 executed by a control system 316, which monitors the field of view 323 of the image capture device 322 for objects that resemble glyphs 202. When the control system 316 determines that a glyph 202 is in the field of view 323 of the image capture device 322, the control system 316 instructs the image capture device 322 to capture an image of the detected glyph 202. The glyph decoder 312 receives the image data containing the glyph 202 and decodes the glyph 202. The glyph decoder 232 may use known decoding techniques to decode the glyph 202 or may transmit the image data to a service provider 110 that decodes glyphs 202.

Upon decoding the glyph 202, the glyph decoder 312 can analyze the command message 255. The glyph decoder 312 can identify the command type 254 to determine the software and/or hardware resources that are implicated by the command type 254. The glyph detector 312 can provide the implicated software and/or hardware the command message 255 or an instruction corresponding to the command message 255. For example, if the command type 254 is to configure a network connection, the glyph decoder 312 can transmit the command message 255 to the configuration application 314. In some implementations, the glyph decoder 312 utilizes an association table to determine which component is implicated by a particular command 258. The glyph decoder 312 may also determine which instructions to issue to a component or resource based on the command type 254. The glyph decoder 312 may utilize a table to make these determinations.

The configuration application 314 configures various components and/or resources of the mobile robot 300. In some implementations, the configuration application 314 configures the network interface device 230 to access a network access point 130. The configuration application 314 receives a command 254, 258 to configure a particular component and one or more command parameters 258. The configuration application 314 then executes the command 254, 258 based on the command parameters 258. The manner by which the configuration application 314 performs the configuration updates depends on the component or resource being configured.

The control system 316 controls the resources 320 of the robot 300. The control system 316 can include a behavior system 316a and a control arbitration system 316b in communication with each other. The control arbitration system 316b allows robot applications 348 to be dynamically added and removed from the control arbitration system 316b and facilitates allowing the applications 348 to each control the robot 300 without needing to know about any other applications 348. In other words, the control arbitration system 316b provides a simple prioritized control mechanism between applications 348 and resources 324 of the robot 300.

The applications 348 can be stored in memory 340 of the robot 300 or communicated to the robot 300 from a service provider 110. The applications 348 can run concurrently on (e.g., on a processor) and simultaneously control the robot 300. The applications 348 may access behaviors 346 of the behavior system 316a. The independently deployed applications 348 are combined dynamically at runtime and to share robot resources 324, 324a-n (e.g., a drive system 324a and/or a cleaning system 324b supported by the robot body 302). A low-level policy is implemented for dynamically sharing the robot resources 324 among the applications 348 at run-time. The policy determines which application 348 has control of the robot resources 324 as required by that application 348 (e.g., a priority hierarchy among the applications). Applications 348 can start and stop dynamically and run completely independently of each other. The control system 316 also allows for complex behaviors 346 which can be combined together to assist each other.

In some implementations, a behavior 346 is a plug-in component that provides a hierarchical, state-full evaluation function that couples sensory feedback from multiple sources, such as the sensor system 224, with a-priori limits and information into evaluation feedback on the allowable actions of the robot 300. Since the behaviors 346 are pluggable into the application 348 (e.g., residing inside or outside of the application 348), they can be removed and added without having to modify the application 348 or any other part of the control system 316. Each behavior 346 is a standalone policy. To make behaviors 346 more powerful, it is possible to attach the output of multiple behaviors 346 together into the input of another so that complex combination functions may be realized. The behaviors 346 are intended to implement manageable portions of the total cognizance of the robot 300.

The mobile robot 300 may include other components not described or shown in FIG. 3. For example, the robot 300 may include a sensor system in communication with the controller 310 to allow the robot 300 to acquire a local sensor perception of its environment.

Figure 4:
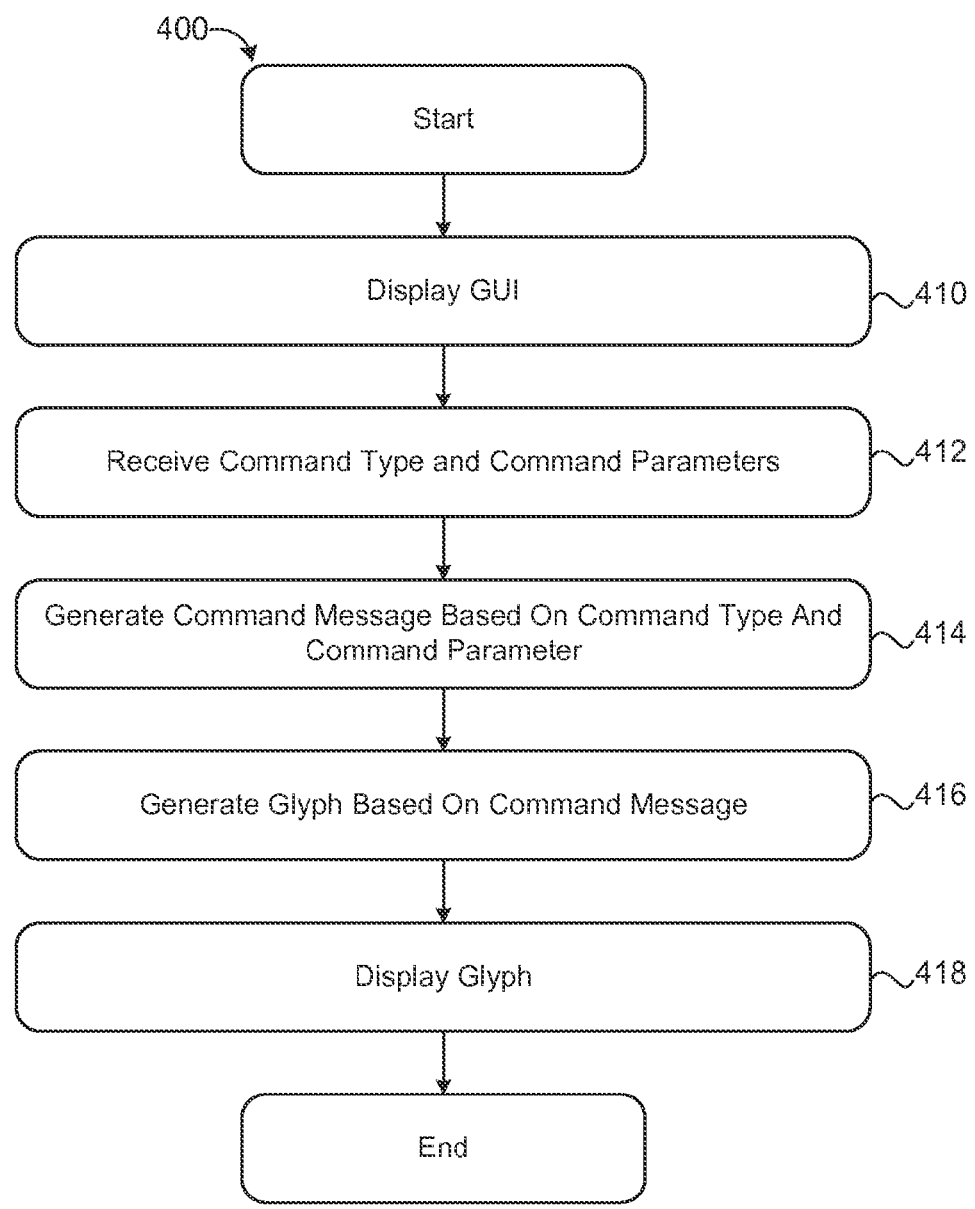
FIG. 4 is a flow chart illustrating a set of operations for an exemplary method for generating a glyph that commands a robot.

FIG. 4 illustrates an example set of operations of a method 400 for generating a glyph 202 that commands a robot 300. The robot interface application 212 may execute the method 400 using the processing device 210 of the computing device 200.

At operation 410, the robot interface application 212 displays a GUI 250 for entering commands 258. At operation 412, the robot interface application 212 receives the command type 254 and the command parameters 258. As shown in FIG. 2B, the GUI 250 can include a field 252 for entering a command type 254. Once a command type 254 is provided, the GUI 250 can include additional fields 256 for entering command parameters 258. The user 100 can enter the command parameters 258 in the additional fields 256.

At operation 414, the robot interface application 212 generates the command message 255 based on the command type 254 and the command parameters 258. The robot interface application 212 may generate command message 255 according to a predetermined format. The command message 255 can include the command type 254, the command parameters 258, and any other suitable information.

At operation 416, the robot interface application 212 generates a glyph 202 based on the command message 255. In some implementations, the glyph 202 can be a QR-code. In these implementations, the robot interface application 212 can generate a glyph 202 according to, for example, ISO/IEC 18004, Information Technology—Automatic Identification And Data Capture Techniques—Bar Code Symbology—QR Code, First Edition Jun. 15, 2000, the contents of which are hereby incorporated by reference in its entirety. In other implementations, the robot interface application 212 can generate a glyph 202 by transmitting the command message 255 to a service provider 110 that generates the glyph 202 and transmits the glyph 202 back to the robot interface application 212.

At operation 418, the robot interface application 212 displays the generated glyph 202 on the user interface 230. Once displayed, the user 100 can position the computing device 200 and the mobile robot 300 in relation to one another. For example, if the computing device 200 is a smartphone or a tablet, the user 100 can position the computing device 200 such that the display device is in front of the image capture device 322 of the mobile robot 300.

The method 400 is provided for example only. Variations of the method are within the scope of the disclosure.

Figure 5:
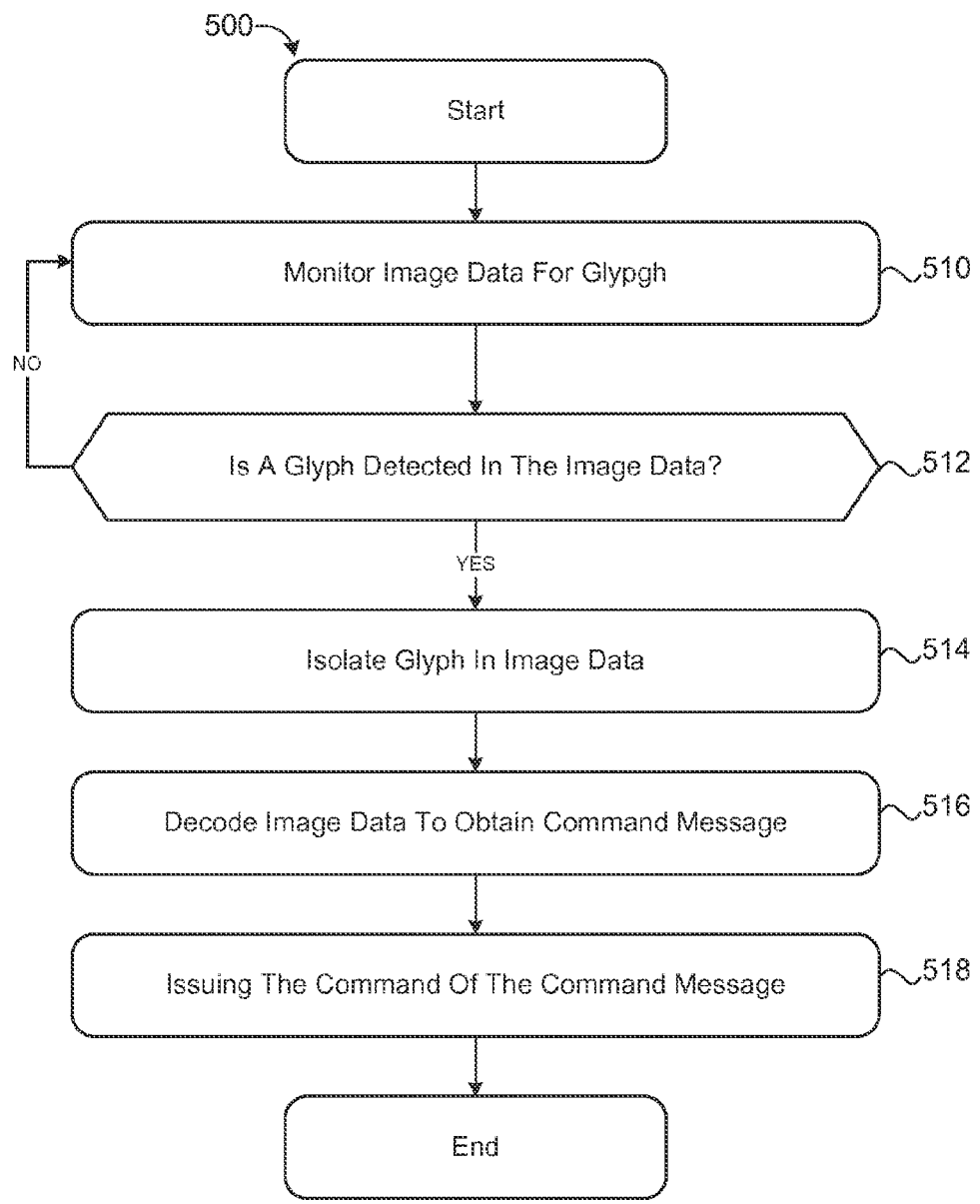
FIG. 5 is a flow chart illustrating a set of operations for an exemplary method for issuing a command message to one or more resources or components of an autonomous mobile robot.

FIG. 5 illustrates a set of operations for a method 500 for issuing a command message 255 to one or more resources 324 and/or components of a mobile robot 300 with limited or no user interfaces.

At operation 510, the control system 316 monitors image data for a glyph 202. The control system 316 can receive the image data from the image capture device 322. At operation 512, the control system 316 determines whether a glyph 202 can be detected in the field of view of the image capture device 322. The control system 316 can execute a behavior 346 that is configured to determine whether an object in the field of view of the image capture device 322. The control system 316 executing the particular behavior 346 can generate a score for each identified object in the field of view. If the control system 316 calculates a score that is greater than a threshold, then the control system 316 determines that a glyph 202 is depicted in the image data. Otherwise, the control system 316 can continue to monitor the image data.

When the control system 316 identifies a glyph 202 in the image data, the control system 316 can provide the image data containing the identified glyph 202 to the glyph decoder 312. At operation 514, the glyph decoder 312 isolates the glyph in the image data. The glyph decoder 312 can perform pattern matching on the image data to identify the boundaries of the glyph 202 and extract the portion of the image data contained within the boundary. The glyph decoder 312 can isolate the glyph 202 in any other suitable manner.

At operation 516, the glyph decoder 312 decodes the image data to determine the command message 255 encoded in the image data. In some implementations, the glyph 202 is a QR-code and the glyph decoder 312 decodes the QR-code. In these implementations, the glyph decoder 312 can decode the glyph 202 according to the ISO/IEC 18004. In some implementations, the glyph decoder 312 can decode the glyph 202 by transmitting an image of the glyph 202 to a partner server 140, which decodes the glyph 202 and returns a command message 255.

At operation 518, the glyph decoder 312 issues the command 255 to one or more resources 324 or components. The glyph decoder 312 can utilize an association table to identify the components or resources 324 implicated by the command message 255. The glyph decoder 312 can then issue the command 255 to an identified component or resource 324. For example, if the command type 254 is a network configuration update, the glyph decoder 312 can provide the command type 254 (e.g., network configuration update) and the command parameters 258 (e.g., SSID and password) to the configuration application 314. The configuration application 314 can then update the configuration data 342 to include the network configuration data. Similarly, if the command type 254 is a time update command, the glyph decoder 312 can provide the command type 254 (e.g., time update) and the command parameters 258 (e.g., minute, hour, day, month, and year) to the configuration application 314, which in turn can update the configuration data 342 to include the updated time. It is noted that while the glyph decoder 312 is described as issuing commands 255 to resources 320 and/or components, another component may be responsible for issuing the commands 255.

The method 500 of FIG. 5 is provided for example only and not intended to limit the scope of the disclosure. Variations of the method 500 are contemplated and are within the scope of the disclosure.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of operating a robot, the method comprising:
   receiving image data from an image capture device of the robot, the image data representative of a glyph viewed by the image capture device on a display of a computing device within a field of view of the image capture device;
   determining, at a controller, a command message based on the glyph represented in the image data; and
   issuing a command to at least one resource or component of the robot based on the command message, wherein determining the command message includes determining network configuration data indicating a network identifier and/or a network password based on the image data, and
wherein issuing the command includes configuring a network connection of the robot based on the network configuration data.

2. A method of claim 1, wherein the glyph comprises a quick response code.

3. A method of claim 1, wherein:
determining the command message includes determining scheduling data based on the image data; and
issuing the command includes setting a robot schedule based on the scheduling data.

4. A method of claim 1, wherein:
determining the command message includes determining customization data including a text string from the image data; and
issuing the command includes configuring a customization setting based on the text string.

5. The method of claim 1, further comprising monitoring the image data to identify the glyph, wherein determining the command message is performed after the glyph is identified in the image data.

6. A method of communicating with a robot, the method comprising:
inputting data on a computing device, the computing device comprising:
an electronic display; and
a processing device in communication with the electronic display, the processing device:
receiving the inputted data;
generating a glyph representative of the inputted data; and
electronically displaying the glyph on the electronic display; and
positioning the computing device to orient the electronic display thereof within a field of view of an image capture device of the robot, a controller of the robot configured to issue one or more commands based on image data received from the image capture device, the image data representative of the glyph viewed on the electronic display of the computing device by the image capture device,
wherein the inputted data is network configuration data including a network identifier and/or a network password, and the network configuration data is used by the robot to configure a network connection of the robot.

7. A method of claim 6, wherein the glyph comprises a quick response code.

8. A method of claim 6, wherein the inputted data is scheduling data, the scheduling data being used by the robot to update a robot schedule.

9. A method of claim 6, wherein:
the inputted data includes a command type and one or more command parameters; and
generating the glyph includes:
generating a command message based on the command type and the one or more command parameters; and
generating the glyph based on the command message, the glyph having the command message encoded therein.

10. An autonomous robot comprising:
a robot body;
a drive system supporting the robot body and configured to maneuver the robot over a floor surface;
an image capture device disposed on the robot body; and
a controller in communication with the drive system and the image capture device, the controller configured to:
issue a command to a component and/or resource of the robot based on image data received from the image capture device, the image data representative of a glyph viewed on a display of a computing device by the image capture device;
identify the glyph in the image data;
determine a command message based on the glyph, wherein the command message includes network configuration data;
command the component and/or resource of the robot based on the command message; and
configure a network connection of the robot based on the network configuration data.

11. A robot of claim 10, wherein the glyph comprises a quick response code.

12. The robot of claim 10, wherein:
the command message includes a schedule update command and schedule parameters; and
the controller updates a schedule of the robot based on the schedule parameters.

13. A system comprising:
a computing device comprising:
an electronic display; and
a processing device in communication with the electronic display, the processing device:
receiving data representative of a command message;
generating a glyph representative of the data; and
electronically displaying the glyph on the electronic display; and
a robot comprising:
a robot body;
a drive system supporting the robot body and configured to maneuver the robot over a floor surface;
an image capture device disposed on the robot body; and
a controller in communication with the drive system and the image capture device, the controller configured to issue one or more commands based on image data received from the image capture device, the image data representative of the glyph viewed on the electronic display of the computing device by the image capture device,
wherein the command message includes network configuration data and the controller is configured to configure a network connection of the robot based on the network configuration data.

14. The system of claim 13, wherein the glyph comprises a quick response code.

15. The system of claim 13, wherein the controller is configured to decode the glyph represented in the image data to obtain the command message and to issue the one or more commands based on the control message.

* * * * *